Jan. 1, 1924 
H. C. HANNA
1,479,713
WHEEL RIM
Filed July 29, 1921
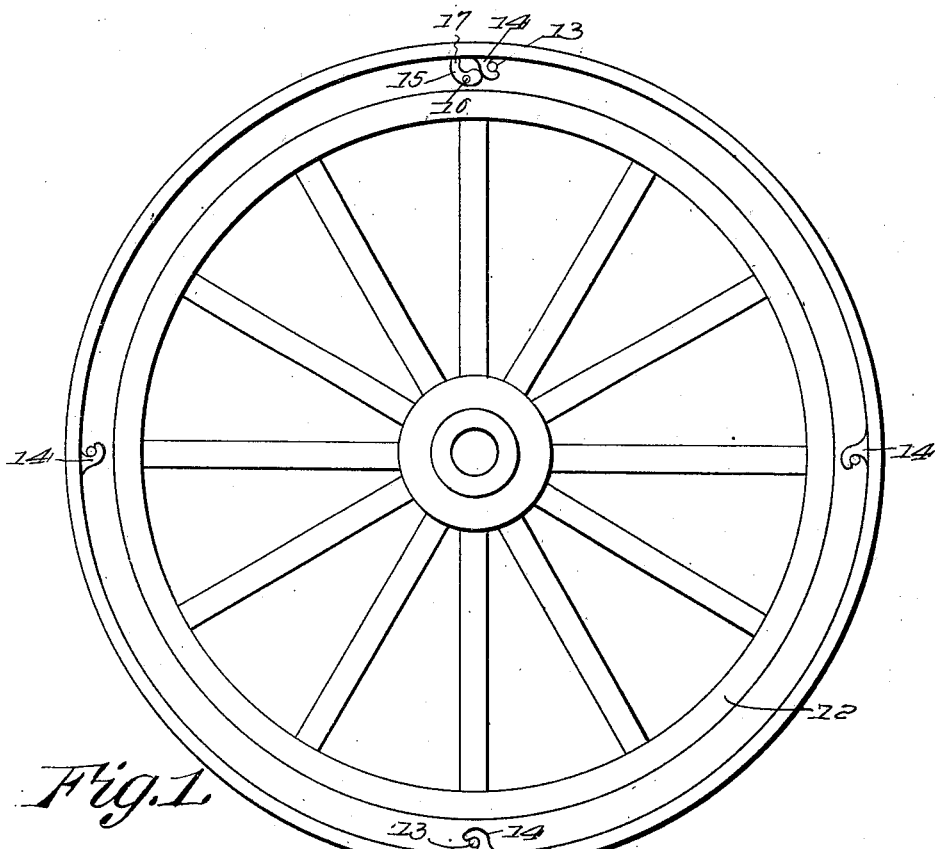
Fig.1.
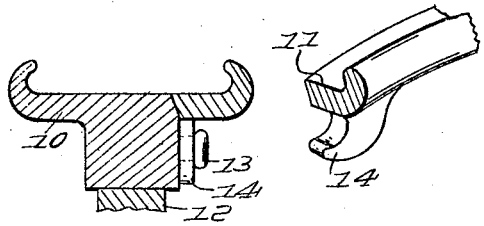
Fig.2.
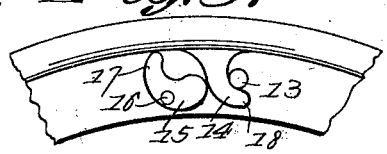
Fig.3.
Fig.4.
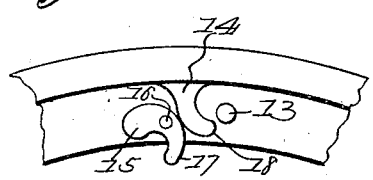
Fig.5.
Inventor
Homer C. Hanna,
By
Attorney.

Patented Jan. 1, 1924.

1,479,713

UNITED STATES PATENT OFFICE.

HOMER C. HANNA, OF OKLAHOMA CITY, OKLAHOMA.

WHEEL RIM.

Application filed July 29, 1921. Serial No. 488,402.

*To all whom it may concern:*

Be it known that HOMER C. HANNA, a citizen of the United States of America, residing at Oklahoma City, in the county of Oklahoma and State of Oklahoma, has invented new and useful Improvements in Wheel Rims, of which the following is a specification.

The object of the invention is to provide a means for readily demounting tires of either the clincher, straight wall or other types and of securely locking said tires in place when mounted, and more particularly to provide a rim having a demountable or removable member designed to be removed to facilitate the demounting of the tire, without involving the necessity of having a complete demountable rim of the collapsible type now commercially known and involving a structure independent of the wheel; and with this object in view the invention consists in a construction and combination of parts of which a preferred embodiment is shown in the accompanying drawings, wherein:—

Figure 1 is a side view of a wheel having a rim constructed in accordance with the invention.

Figure 2 is a transverse sectional view of the rim showing the demountable member thereof in its operative position.

Figure 3 is a detail view of a portion of the demountable member.

Figures 4 and 5 are enlarged detail views of one of the rim holding lugs and the means for locking the same in its engaged position, the locking means in said views being shown respectively in engaged and disengaged relation with the lug.

The rim consists of the stationary member 10 and a removable member 11 of which the former constitutes a part of the structure of the wheel 12 and carries transverse studs 13 for engagement by the hook lugs 14 carried by the demountable member and engageable with said studs by a rotary or turning movement of the demountable member with relation to the stationary member as will be obvious by referring to Figure 5 in which the lug is shown in its disengaged position and to Figure 4 in which it is shown in its engaged position.

Mounted upon the stationary member of the rim in operative relation with one of the lugs 14 is a locking means consisting of a cam 15 pivoted as at 16 and having an arm 17 which serves by contact with the adjacent portion of the demountable member to limit the pivotal movement thereof, as indicated in Figure 4.

Therefore with the locking device in the position indicated in Figure 5 the demountable member may be applied to the fixed member with the lugs occupying the positions relative to the studs as shown in Figure 5, after which a turning movement to the right of the demountable member will cause the engagement of the horns 18 of the lugs with the stud and thereupon, by turning the cam the lug will be locked in engagement with the stud and consequently the demountable member will be locked against reverse rotary movement to prevent accidental disengagement of the lugs from the studs.

It will be understood that while a rim of the clincher type is illustrated in the drawing, the application of the rim structure otherwise is not limited to this type as it is equally adapted for use in connection with tires of the straight wall and other types.

Having described the invention, what is claimed as new and useful is:—

A wheel rim having fixed and demountable annular members of which the formed is provided with lateral studs and the latter with lugs having circumferentially directed horns for engagement with said studs by a rotary movement of the demountable member, and a cam pivotally mounted on the fixed member adjacent one of said lugs for abutting engagement with the same when engaged with its attendant stud, said cam being provided with an arm for abutting engagement with the adjacent portion of the demountable member to limit the pivotal movement thereof.

In testimony whereof he affixes his signature.

HOMER C. HANNA.